C. S. RUGGLES.
FISHERMAN'S SIGNALING DEVICE.
APPLICATION FILED MAY 1, 1915.
1,162,257.
Patented Nov. 30, 1915.
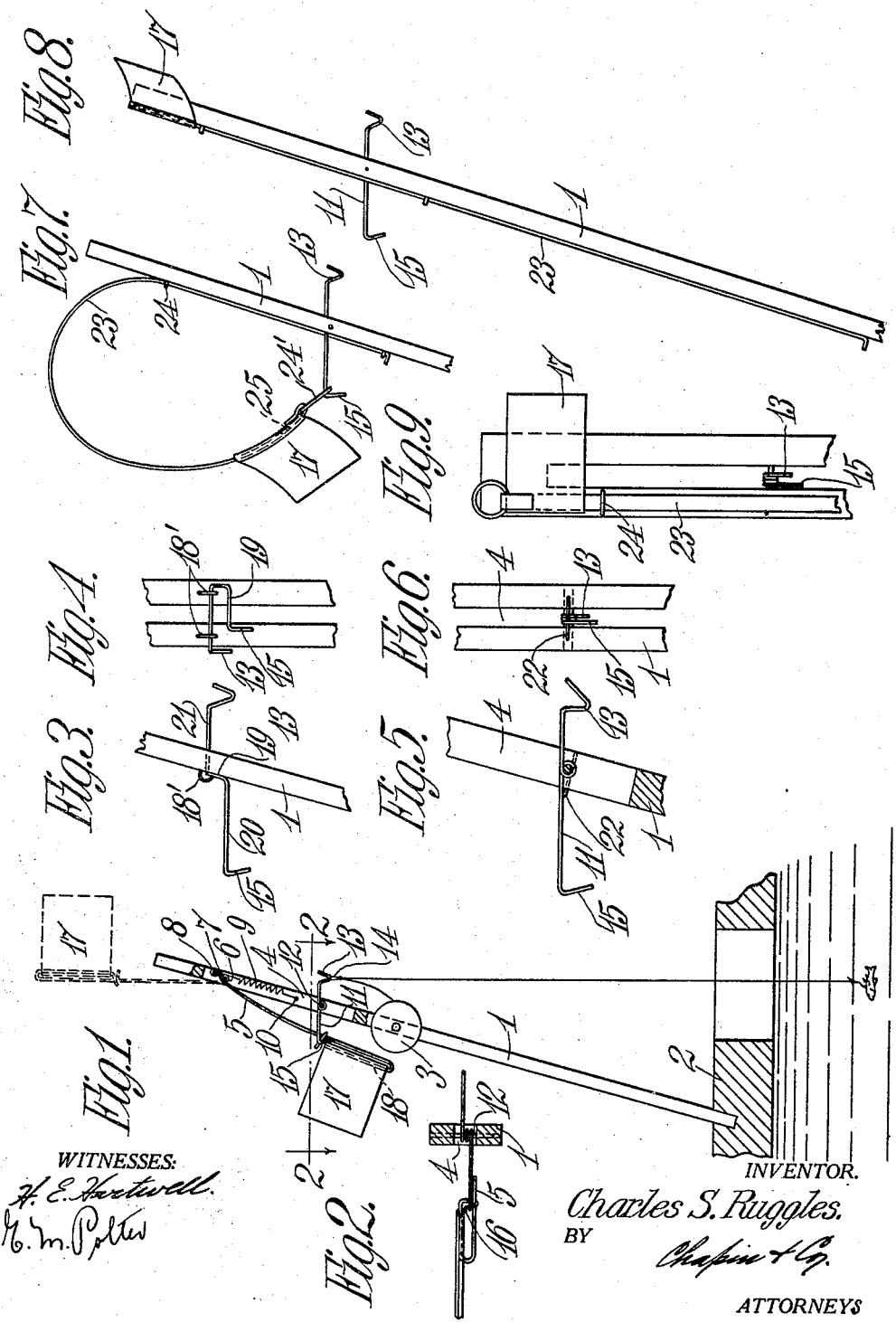
WITNESSES:
H. E. Hartwell
G. M. Potter
INVENTOR.
Charles S. Ruggles.
BY
Chapin & Co.
ATTORNEYS

UNITED STATES PATENT OFFICE.

CHARLES S. RUGGLES, OF THREE RIVERS, MASSACHUSETTS.

FISHERMAN'S SIGNALING DEVICE.

1,162,257.  Specification of Letters Patent.  Patented Nov. 30, 1915.

Application filed May 1, 1915. Serial No. 25,154.

*To all whom it may concern:*

Be it known that I, CHARLES S. RUGGLES, a citizen of the United States of America, and residing at Three Rivers, in the county of Hampden and State of Massachusetts, have invented certain new and useful Improvements in Fishermen's Signaling Devices, of which the following is a specification.

This invention relates to improvements in fisherman's signaling device, so called, for fishing through the ice. The invention broadly, comprises a standard or post member to which a suitable signal device is attached. The signal device in this class of inventions is usually a spring-actuated pivoted member to which a small flag is attached and devices for releasably retaining the pivoted member in a downward position. Suitable connections are associated with the hook and line and the reel on which the line is wound, whereby when the bait is seized by a fish, the signal member is instantly tripped, causing the same to fly upward into a vertical position, in order to indicate to the user that the bait has been seized.

The present invention also comprises, in combination with the post member, a pivotally mounted trigger or trip device having a hook at one end to temporarily receive and hold the line as it leaves the reel and a hook at its opposite end for releasably retaining the signal device in an inoperative position, and also means to automatically hold the trigger member in a horizontal position.

Referring to the drawings—Figure 1 shows the complete device in a set position, that is to say, with the signal device lowered, a reel with a portion of the line extending therefrom and hooked over the end of the inner end of the trigger; Fig. 2 is a horizontal sectional view on the line 2—2 of Fig. 1, showing the trigger attached to the pivoted arm of the signal device before the same is tripped; Fig. 3 is a detail view of a modified form of trigger device; Fig. 4 is a front elevational view of Fig. 3, showing the trigger pivotally supported on the outer side of the post and so bent as to automatically assume a horizontal position; Figs. 5 and 6 are a further modification in which a bar is located across the front portion of the post to retain the trigger in a horizontal position; Figs. 7 and 8 are further modifications in which the signal-device, instead of being formed of wire suitably pivoted in an opening in the post member, as shown in Fig. 1, is composed of a strip of spring metallic tape; and Fig. 9 is a front elevational view of the post showing the manner of mounting the spring tape on the post member in order to allow it to slide thereon.

Referring to the drawings in detail: 1 designates the post which is secured to the ice, indicated at 2, in the usual manner. Rotatably mounted on the post is a reel 3 on which the line is wound. The post 1 is formed with a longitudinal opening 4 cut therethrough at its upper end in which is pivotally mounted the wire 5 having a coiled portion, as indicated at 6, to receive a pivot-pin 7. The upper end of the wire 5 is formed with a loop 8 to which one end of a coiled spring 9 is attached, the other end of the spring being secured in the opening 4 by means of a pin, indicated at 10. 11 is a pivotally mounted trigger or latch for releasably retaining the signal device in a lowered position. This trigger or latch is mounted to have a freely swinging movement on the pin 12. One end of the latch is formed with a hook 13 to receive a loop in the line indicated at 14. The other end of the latch is formed with a downturned end portion 15 that is designed to engage and pass over the bent part 16 of the signal device, as shown in Fig. 2. The flag or signal proper is indicated at 17 and is attached to the wire 5 in any suitable manner as by looping the wire, as indicated at 18.

The operation of the construction shown in Figs. 1 and 2 is as follows: Considering the bait at the lower end of the line to be seized, a downward pull on this line will rotate the trigger, causing the end 15 to be lifted from the part 16 of the wire 5. The spring 9 immediately retracts throwing the flag upward into the dotted line position. At the same time, the loop 14 slips off from the hook part 13 of the trigger, giving the fish a free run and permitting the line to unwind from the reel 3. In order to reset the signal device, it is only necessary to spring the arm 5 back again against the tension of the spring 9 to the position shown in Figs. 1 and 2.

Referring to Figs. 3 and 4 in which the trigger, instead of being mounted on the pin 12, as shown in Fig. 1, is pivotally retained by means of the staples 18'. In this construction, the trigger is formed with a downwardly bent part 19 to form a shoulder to bear against the front face of the post 1 and thereby retain the trigger always in a horizontal position, as shown in Fig. 3 after the signal device is released, it being understood that the arm 20 is long enough to overweight the arm 21. The hook devices 13 and 15 are the same as already described in connection with the Figs. 1 and 2.

Referring to Figs. 5 and 6, the trigger is identical in construction with that shown in Figs. 1 and 2 with the exception that a bar 22 extends across the face of the post 1 and is for the purpose of retaining this trigger always in a horizontal position, whereas, in Figs. 1 and 2, the trigger can drop down into a substantially vertical position in the opening 4 of the post after the signal device is released, as shown in dotted lines.

Referring to Figs. 7 and 8, the signal device in this modification comprises a thin strip of elastic steel tape 23 that is slidably mounted, by means of staples 24 on the post 1. The flag or signal 17 is suitably secured to the upper end of this elastic tape as before.

In Fig. 8, the elastic tape is shown slipped down to the lower end of the post 1, whereas, in Fig. 7, it is shown pushed up toward the upper end and bent over in a downward or set position, the end of the tape being provided with a ring 24' for receiving the downturned end 15 of the trigger. It is to be understood that the ring 24' may be omitted and openings or eyes formed directly in the part 23, as indicated at 25. It is also to be understood that the trigger shown in Figs. 7, 8, and 9 may be supported in a horizontal position by means of a bar 22 although it is shown in these figures as unsupported or freely pendant as in Figs. 1 and 2.

What I claim is—

In fisherman's signaling device, the combination, of a post, means for attaching a reel thereto on which the line is coiled, said post having a longitudinal opening through the upper end thereof, a trigger device having a single point of support located in said opening and having one end longer than the other to overweight the same in order to make it assume a horizontal position, and means for retaining said trigger device in a horizontal position, a signal device adapted to be moved downward into a position substantially parallel to the post member and retained in this position by the trigger, a spring in the opening having one end attached to the post and the other end to the signal device whereby, when the signal device is released, it will assume a position substantially in alinement with the post member, as described.

CHARLES S. RUGGLES.

Witnesses:
HARRY W. BOWEN,
H. E. HARTWELL.

Copies of this patent may be obtained for five cents each, by addressing the "Commissioner of Patents, Washington, D. C."